Sept. 12, 1961     A. NORWICH     2,999,589
CLASSIFYING APPARATUS

Filed March 9, 1960     2 Sheets-Sheet 1

INVENTOR
Alan Norwich
By Anthony D. Cennamo

Sept. 12, 1961  A. NORWICH  2,999,589
CLASSIFYING APPARATUS
Filed March 9, 1960  2 Sheets-Sheet 2

Inventor
Alan Norwich

United States Patent Office 2,999,589
Patented Sept. 12, 1961

2,999,589
CLASSIFYING APPARATUS
Alan Norwich, Delaware, Ohio, assignor to Industrial Nucleonics Corporation, a corporation of Ohio
Filed Mar. 9, 1960, Ser. No. 13,752
6 Claims. (Cl. 209—82)

This invention relates to electronic apparatus for classifying production items traveling along an inspection line, and more specifically it relates to means for detecting the presence of a deficiency in a passing item and means for automatically rejecting items having such deficiency.

The invention will be herein illustrated and described in combination with a fill-level gauge and rejection apparatus for under-filled bottles, although many other industrial applications for the principles and circuitry disclosed herein will be immediately apparent.

Many known devices in the category of the present invention are subject to one of two shortcomings which limit their adaptability to the great variety of industries which could profitably utilize such devices. On the one hand, the available defective unit rejection systems which are simple and inexpensive unfortunately require that the conveyor speed be maintained constant. This is a severe restriction which cannot be tolerated on many assembly or inspection lines. On the other hand, the available systems which are capable of proper operation independent of conveyor speed variations unfortunately have to be equipped with complex and expensive "memory" devices for delaying the reject signals for the variable length of time required for a defective object to travel from the gauging position to the marking or ejecting position. These devices increase the initial investment and maintenance costs beyond the economically feasible limit for many industries.

It is the object of this invention to provide a simple, economical and reliable classifier system whose operation is not dependent on conveyor speed, and which does not require the usual signal delay or memory devices to synchronize its operation with the movement of the conveyor.

It is another object to provide circuitry whereby both a quality indicator signal and a position indicator signal may be extracted from the electrical output of a gauge responsive to said quality.

It is still another object to provide novel apparatus including a capacitance type fill-level detector for rejecting improperly filled containers passing an inspection point on a traveling conveyor.

It is a further object to provide means whereby a plurality of logical circuit functions are performed reliably by a lesser plurality of electron tube circuits.

Other objects and advantages will become apparent from the following detailed description of one preferred embodiment of the invention, taken in conjunction with the appended drawings, in which.

Figure 1:
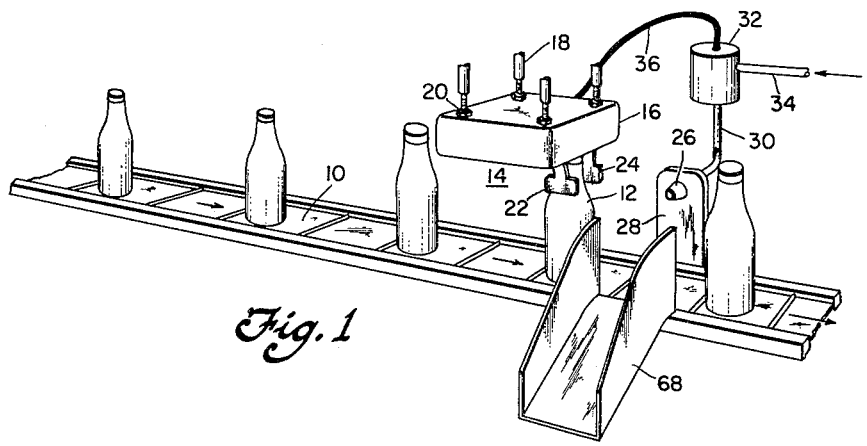
FIG. 1 is a perspective showing of an inspection line having means for automatically rejecting underfilled bottles in accordance with the invention.

Referring now to FIG. 1, there is shown a traveling conveyor 10 bearing a plurality of previously filled glass bottles as at 12, which pass in succession through a fill-level gauge and under-fill detector 14. This device may be contained in a metal box 16 which is suspended from a suitable overhead support (not shown) by means of four strut rods 18, each equipped with a turnbuckle-type leveling and height-adjusting screw as at 20. Depending from box 16 are a pair of spaced electrodes 22 and 24 constituting a capacitance probe adapted to straddle the neck of the bottle, as at 12, in non-conducting proximity thereto. Adjacent one side of the conveyor 10, and positioned a small distance downstream of the probe electrodes, there is mounted an air jet 26 supported on the upstanding portion 28 of an L-shaped member secured at or to the side of the conveyor. The jet 26 is connected by an air hose 30 to an electrical solenoid valve 32 which in turn is connected to an air pressure tank (not shown) by a supply line 34. The valve 32 is normally held closed by electric power applied through leads 36 from box 16 which contains the gauge and the ejector control circuits whose functional arrangement is outlined in FIG. 2.

Figure 3:
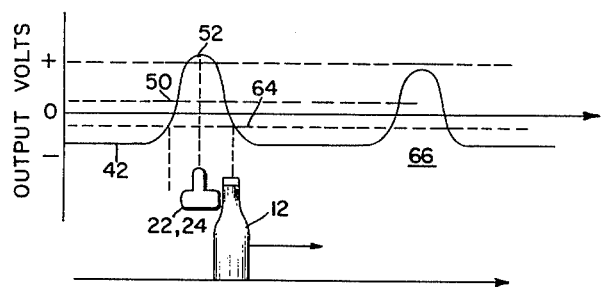
FIG. 3 is a graph illustrating the relationship of the fill-level gauge output waveform to the position of either adequately filled or underfilled bottles, to clarify the operation of the ejector system.

The fill level gauge indicated at 38 is adapted to provide an output on line 40 having the characteristics shown in FIG. 3. The latter is a plot of voltage output versus bottle position with respect to electrodes 22 and 24. When there is no bottle in proximity to the electrodes, the gauge output voltage is negative, at the level 42. As the bottle approaches the electrodes, it enters the fringe of the radio-frequency field therebetween, and as a result the output voltage rises through zero to a positive value.

It is seen that the gauge output line 40 is connected to the respective inputs of a set trigger circuit 44 and a reset trigger circuit 46. The outputs of these trigger circuits are respectively connected to the set and reset inputs of a flip-flop 48 having two stable states designated as binary zero and binary one.

Assuming that the bottle 12 is adequately filled and that the flip-flop 48 is in its "zero" state, as the gauge output voltage reaches the positive level indicated at 50, the set trigger 44 will drive the flip-flop to its "one" state. When the gauge output voltage reaches the higher positive level indicated at 52, the reset trigger 46 will reset the flip-flop to its "zero" state. In the latter state, as indicated, the flip-flop delivers an inhibitor signal to a gate 54 inserted between the gauge output line 40 and an eject trigger 56.

The eject trigger 56 controls a relay driver 58 which in turn operates a relay 60 controlling the application of electric power to an ejector 62. The ejector is represented in FIG. 1 by the solenoid air valve 32, although it will be apparent that any other known type of electrical, mechanical, or alternate form of fluid operated ejector system may be used.

The eject trigger 56 is adapted to be operated, as the bottle passes out of the electrodes 22 and 24, by the negative-going gauge output signal when the same reaches the voltage level indicated at 64, FIG. 3. However, in the case of an adequately filled bottle, as hereinabove described, the presence of the inhibitor signal at gate 54 prevents such operation.

In the case of an underfilled bottle, referring to the second portion 66 of the output waveform, the set trigger 44 will again drive the flip-flop 48 to its "one" state as the positive-going voltage reaches level 50. However, because of the underfilled condition of the bottle, the peak of the waveform, as the bottle passes through the center of the electrodes, is less than the level 52 required to operate the reset trigger 46. Accordingly, the flip-flop 48 will not be reset, and the inhibitor output thereof will not be present at gate 54. Hence, when the negative-going gauge output voltage passing gate 54 reaches the level 64, the eject trigger 56 is operated, thus resulting in operation of the ejector 62. In the particular apparatus shown in FIG. 1, the solenoid valve 32 is de-energized, allowing a blast of compressed air to issue from jet 26, tilting the underfilled bottle off the conveyor 10, whereupon it may slide down a chute 68 to a suitable receiver.

Figure 4:
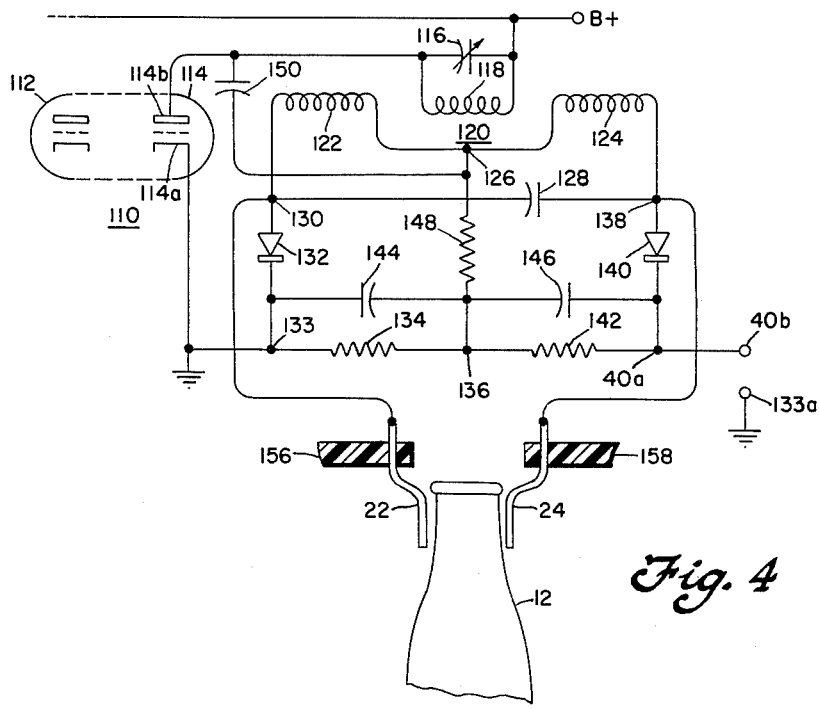
FIG. 4 is a schematic and detailed circuit diagram of the capacitance type fill-level and container position detector.

A suitable gauge 38 for use in the above-described system is illustrated in FIG. 4, wherein there is shown a radio-frequency source 110 consisting of a one-tube circuit which includes a conventional oscillator section 112 and a voltage doubler stage 114. Stage 114 further acts as a buffer to minimize the effect of changed parameters, in the capacitance probe and detector circuit to be described, on the oscillator section 112.

The plate circuit of the triode 114 includes a resonant circuit which is tunable by means of a variable capacitor 116, and which includes the primary coil 118 of a discriminator transformer 120. The secondary circuit of the transformer 120 includes a pair of windings 122 and 124 having a common connection 126 at one end thereof. The coils 122 and 124 are wound as in a single center-tapped coil so that the opposite ends thereof are oppositely phased, and the same are connected across a capacitor 128 to form a second resonant circuit.

One terminal 130 of the second resonant circuit is connected through a rectifier diode 132 and a resistor 134 to a point 136. The other terminal 138 of the second resonant circuit is connected through a second rectifier diode 140 and a second resistor 142 to point 136. Resistors 134 and 142 are respectively shunted by capacitors 144 and 146, and points 126 and 136 are connected through a resistor 148. Point 126 is coupled to the plate 114b of triode 114 through a capacitor 150. The junction 133 of diode 132 and resistor 134 is returned to ground in common with the cathode 114a of triode 114. The junction 40a of diode 140 and resistor 142 is connected to an output terminal 40b.

Figure 2:
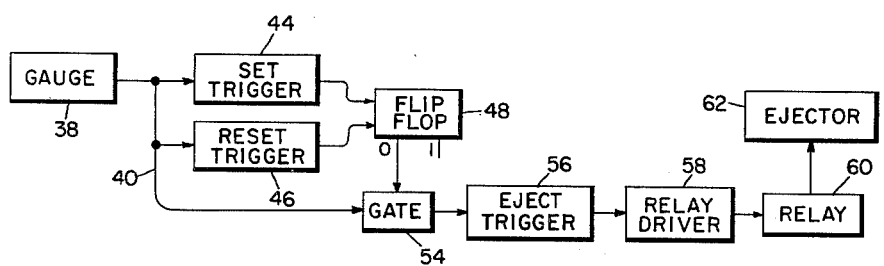
FIG. 2 is a block diagram of the ejector logic circuitry employed in the system of FIG. 1.

Connected in parallel relation to capacitor 128 are the pair of metal plates 22 and 24, also shown in FIGS. 1, 2, and 3, resembling paddles with offset bends in the "handles" thereof, which are suspended from suitable insulating supports 156 and 158 so that the broad portions of the plates are brought into proximity to the neck of a bottle 12 whose fill level is to be checked.

In the operation of the circuit, the primary coil 118 of the discriminator transformer 120 and variable capacitor 116 constitute the tuned plate circuit of the frequency doubler stage 114. The left half 122 of the secondary coil, diode 132, resistor 134 and shunt capacitor 144, and resistor 148 form a loop circuit wherein pulsating direct current flows on alternate half cycles of the radio-frequency voltage induced in coils 122 and 124. Similarly, the right half 124 of the coil, diode 140, resistor 142 and capacitor 146, and resistor 148 form a loop circuit wherein direct current flows on the intermediate half cycles. The current flow in the two loops develops voltages across resistors 134 and 142 which are filtered by capacitors 144 and 146.

The direct voltages developed across capacitors 144 and 146 as a result of the induced radio-frequency voltages across coil halves 122 and 124 are substantially equal and opposite, so that their sum appearing between points 133 and 40a is substantially zero. However, the two loop currents are also dependent on the radio-frequency voltage applied across the loops by the capacitor (150) coupling of the triode plate (114b) voltage to point 126. The last-mentioned voltage exhibits a reference phase relation to the triode plate voltage. The phase relation thereto of the voltage across the terminals 130 and 138 of the secondary tuned circuit, however, is dependent on the amount and direction of the difference between the resonant frequency of the tuned circuit and the frequency of the plate voltage variation, and the resonant frequency is in turn dependent on the impedance of the capacitance probe astraddle of the bottle neck.

For a given level of liquid in the bottle 12, the tuning of the circuits may be such that the secondary tuned circuit voltage has a ninety degree phase relation to the reference voltage. In this case the reference voltage, which is vectorially added to both of the two oppositely phased voltages induced in coil halves 122 and 124, contributes equally to the driving voltage in both loops, so that the sum of the voltages across capacitors 144 and 146 is zero. A change in the liquid level, however, will cause a deviation from the ninety-degree phase relation and thereby unbalance the driving voltages in the two loops so that said sum is no longer zero, whereupon an output voltage will appear between terminal 40b and ground 133a, said voltage having a polarity which is indicative of the direction of the change in liquid level.

It will be apparent that by a very simple retuning procedure said voltage can be adjusted so that it will or will not pass through zero at any selected liquid level. In the circuit shown, the adjustment was made by changing the oscillator frequency, but if desired the oscillator can be crystal controlled and capacitor 128 can be variable to effect the discriminator tuning.

Figure 5:
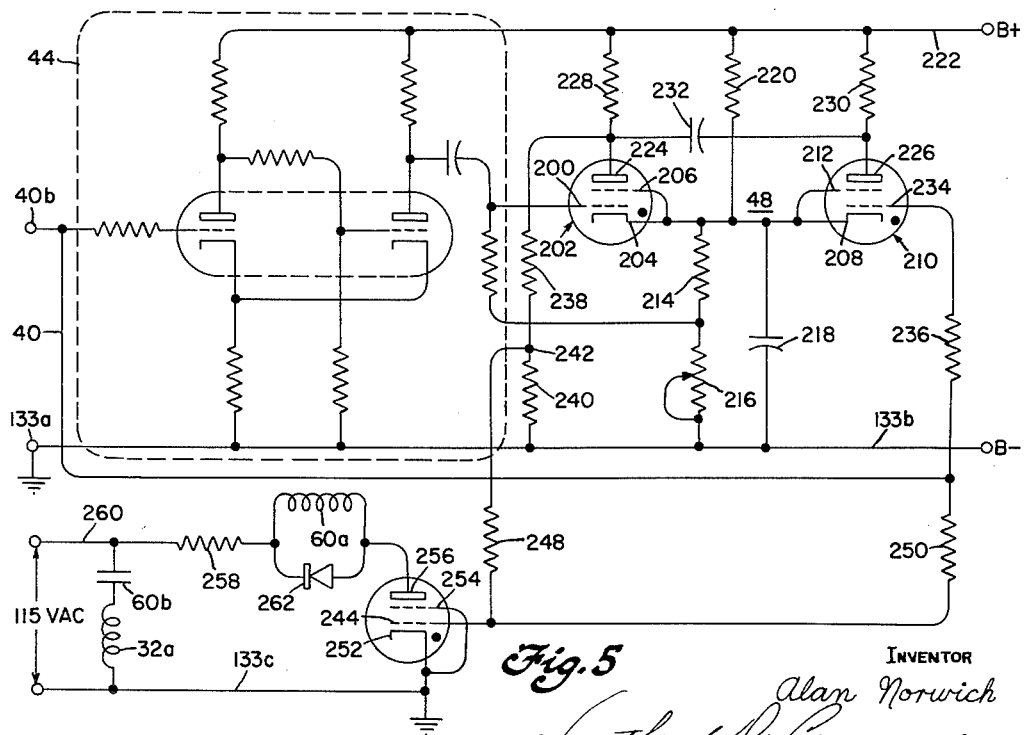
FIG. 5 is a detailed circuit diagram of a preferred embodiment of the ejector logic circuits, whereby a plurality of the building-block circuits of FIG. 2 are combined in a lesser plurality of thyratron tube circuits.

FIG. 5 repeats the showing of the gauge output terminals 40b and 133a (ground). It is seen that line 40, connected to terminal 40b, is also connected to the input of a conventional Schmitt trigger circuit shown enclosed within a dotted line 44. Although this circuit is shown in detail for completeness, no explanation of its well-known construction or operation is believed necessary herein.

The output of the trigger circuit 44 is connected to the first grid 200 of a thyratron tube 202 having a cathode 204 and a second grid 206 connected directly thereto. The cathode 204 also has a common connection with the cathode 208 of a second thyratron 210 and its second grid 212. The two cathodes 204 and 208 are further connected to the grounded negative side 133b of the usual direct current power supply (not shown) through the series combination of a resistor 214 and a rheostat 216. The cathode voltage across this combination is filtered by a shunt-connected capacitor 218 which is sized to provide a few milliseconds time-constant. A positive cathode bias voltage component is provided by connecting a resistor 220 between the cathodes 204 and 208 and the positive (B+) side 222 of the power supply. The plates 224 and 226 of thyratrons 202 and 210 are respectively connected to said line 222 by respective plate load resistors 228 and 230. The plates 224 and 226 of the two thyratrons are coupled by a capacitor 232.

The thyratron circuits above described constitute the flip-flop 48 of FIG. 2. The same circuits are adapted to further perform the function of the reset trigger 46, and accordingly it is seen that the gauge output on line 40 is connected to the first grid 234 of thyratron 210 through a grid stopper resistor 236.

Connected between the plate 224 of thyratron 202 and ground 133b is a voltage divider comprising a pair of resistors 238 and 240. The junction 242 thereof is connected to the first grid 244 of a thyratron 246 through a first summing resistor 248. Said grid is further connected through a second summing resistor 250 to the gauge output line 40. This circuit performs the function of the gate 54 of FIG. 2.

The thyratron 246 is adapted to perform the functions of the eject trigger 56 and relay driver 58. The cathode 252 and second grid 254 of this thyratron are connected to the grounded side 133c of the usual 115 v. A.C. power source. The plate 256 circuit includes the coil 60a of the relay 60, which is connected through a suitable dropping resistor 258 to the other side 260 of the A.C. power source. The usual rectifier 262 is connected across the relay coil 60a to smooth out the half-wave rectified plate current which flows therein when the thyratron is firing and to minimize stray pulse generation as a result of self-induction. The coil 32a of the solenoid air valve 32 is connected across lines 260 and 133c in series with a set of normally open contacts 60b of relay 60.

The operation of the circuit of FIG. 5, with reference also to FIGS. 1 and 3, is as follows. Assume that thyratron 256 is firing, whence relay 60 is energized, contacts 60b thereof are closed and solenoid coil 32a is energized, cutting off the supply of air to jet 26. Flip-flop thyratron 210 is also firing, and since the same is energized with a D.C. voltage the discharge through the tube proceeds independently of the voltage on the grid 234 thereof. The current flow through the tube and that through resistor 220 are supplied through cathode resistor 214 and rheostat 216, and accordingly a substantial positive bias appears on the cathodes 204 and 208 of the flip-flop thyratrons, whereby thyratron 202 is positively cut off. The plate 224 thereof has a high positive potential which is applied across resistors 238 and 240. The portion of this potential which appears at point 242 therebetween is summed by resistors 248 and 250 with the gauge output on line 40 so that the negative potential thereof as at 42, FIG. 3, is unable to cut off the thyratron 246 when no bottle is in the vicinity of the probe electrode.

As the bottle 12 enters the probe and the gauge output voltage goes positive to the value 50, the trigger circuit 44 delivers a sharp positive pulse to the grid 200 of flip-flop thyratron 202, causing the same to fire. The plate voltage of thyratron 202 falls rapidly, transmitting a negative pulse to the plate 226 of thyratron 210. This negative pulse reduces the potential at plate 226 sufficiently to de-ionize thyratron 210, which ceases to conduct plate current. The plate 226 potential is shortly restored as capacitor 232 becomes charged in the opposite direction, but because of its positive cathode bias thyratron 210 cannot refire even though the gauge output voltage applied to its grid 234 has a substantially positive value with respect to ground 133b.

However, in the case where a bottle passing through the probe is adequately filled, the gauge output voltage applied to grid 234 continues to increase until it reaches the level 52, whereupon the thyratron 210 is enabled to fire. It is apparent that the voltage level 52 is adjustable by means of rheostat 216 in the common cathode circuit of thyratrons 202 and 210, since the resistance in this circuit determines the amount of cathode bias which must be overcome by the positive-going signal output of the gauge. The firing of thyratron 210 causes a negative pulse to be transmitted to the plate 224 of thyratron 202 via capacitor 232, thus de-ionizing thyratron 202 and resetting the flip-flop to its original binary zero state. Shortly the voltage at the plate 224 will rise as capacitor 232 is re-charged with its original polarity. This restores the previously described inhibitor gate voltage through summing resistor 248 to the grid 244 of thyratron 246.

Considering the case where a bottle passing through the gauge is inadequately filled, when the gauge output voltage reaches level 50 the flip-flop 48 will again be driven to its binary one state wherein thyratron 202 is firing and thyratron 210 is cut off. In this case the gauge output voltage applied to grid 234 of thyratron 210 will not rise to the level 52 which is required to overcome the positive cathode bias of this tube and thereby fire the same. Hence thyratron 202 will continue to conduct current.

It may be mentioned that as the bottle is moving out of the capacitance probe and the positive gauge signal output decreases below the level 50, the Schmitt trigger 44 will reset and thereby deliver a negative pulse to the grid 200 of thyratron 202. However, since the grid voltage has no control of the discharge through this tube when the same is once initiated, it is unnecessary to provide any clipper circuit or other arrangement to suppress said pulse.

When thyratron 202 is firing, there is only a small positive voltage appearing at the junction 242 of resistors 238 and 240. Accordingly when the gauge output voltage on line 40 goes negative to the value 64, FIG. 3, a net negative voltage appears on the grid 244 of thyratron 246, and being energized by an A.C. voltage the current through this tube is cut off, de-energizing relay 60, whose contacts 60b open. This in turn de-energizes the coil 32a of the solenoid air valve 32, permitting a blast of air to issue from jet 26 and thus ejecting the under-filled bottle from its place on the conveyor.

Figure 6:
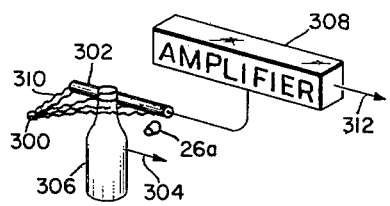
FIG. 6 is a showing of an alternate type of gauge having suitable output characteristics for operation with the ejector control circuits of the invention.

While the ejector circuits herein described are adapted for use with the novel capacitance type fill height gauge, other types of gauges can be used. For example, in FIG. 6 there is shown a radiation gauge employing a radiation source 300 and an elongated detector 302 located on opposite sides of the path 304 of bottles as at 306 on a conveyor. The detector 302 is connected to a suitable amplifier 308. As seen by the elongated detector 302, the radiation beam, shown by wavy lines 310, from the source is fan-shaped and lies in a horizontal plane. It is apparent that as a bottle enters the fringe of the fan-shaped radiation beam, the radiation which would otherwise reach one end of the long detector is attenuated by the mass of the bottle, and accordingly the total detector output decreases. As the bottle moves further into the center of the beam, the output decreases a maximum amount depending on the fill level of the bottle. Hence it is seen that the amplifier 308, which may be a phase inverter type if desired, can be made to deliver an output waveform similar to that of FIG. 3. It is further apparent that the ejection signal can be generated when the bottle is still in the fringe area of the radiation beam, but at the same time when there is sufficient clearance for the bottle to be ejected, for example by the air jet 26a, without striking the radiation source. This is analogous to the situation shown in FIG. 3, where the ejection signal is generated while the bottle 12 is still in the fringe field of the capacitance probe but at the same time sufficiently physically clear thereof to permit its ejection. The device of FIG. 6 is the subject of a co-pending application Serial No. 730,347, filed April 23, 1958, by Jack G. Crump, to which reference can be made for specific construction details.

While the classifier has been illustrated and described in combination with means for identifying defective objects by bodily ejection thereof from a conveyor line, other well-known identification methods may be used; for example, marking of the object by means of a paint spray or the like.

Many other changes and modifications can obviously be made without departing from the scope of the invention as is set forth in the appended claims.

What is claimed is:

1. In an apparatus for automatically inspecting a series of conveyor-borne objects for a physical characteristic, said apparatus having means for selectively identifying those objects having a deficiency in said characteristic, the combination of gauging means mounted adjacent to the conveyor and responsive both to the proximity of a passing object and to the value of said characteristic therein for providing an aggregate signal which includes a proximity component and a characteristic-indicative component, switch means for controlling said identification means, means for enabling said switch means when said signal increases to a first selected value, means for disabling said switch means when said signal increases to a second selected value which is greater than said first value, and means for actuating said enabled switch means when said signal decreases to a third selected value.

2. In an apparatus for automatically inspecting a series of conveyor-borne objects for a physical characteristic, said apparatus having means actuated by the delivery thereto of an identification signal for selectively identifying those objects having a deficiency in said characteristic, the combination of gauging means mounted adjacent to the conveyor and responsive both to the proximity of a passing object and to the value of said characteristic for producing a time variant electrical pulse whose height is indicative of the value of said characteristic and whose width is indicative of the transit time of an object's passing in proximity to said gauging means, means for generating an identification signal when said pulse height fails to reach a selected value, and means responsive to the trailing edge of said pulse for timing the delivery of said identification signal to said object identifying means.

3. In an apparatus for automatically inspecting a series of conveyor-borne objects for a physical characteristic thereof, said apparatus including means actuated by an identification signal for identifying those objects having a deficiency in said characteristic, the combination of gauging means mounted adjacent to the conveyor and responsive both to the proximity of an object and to said characteristic thereof for producing a time-variant electrical pulse whose height is indicative of the value of said characteristic and whose width is indicative of the transit time of an object's passing said gauging means, switch means responsive to the trailing edge of said pulse for providing said identification signal to said object identifying means, and a bistable device triggered on by the leading edge of said pulse for enabling said switch means and triggered off by said pulse at a selected minimum value of the height thereof for disabling said switch means.

4. In an apparatus for automatically inspecting a series of conveyor-borne objects for a physical characteristic, said apparatus having means for selectively identifying those objects having a deficiency in said characteristic, the combination of gauging means mounted adjacent to the conveyor and responsive both to the proximity of a passing object and to the value of said characteristic therein for providing an aggregate signal which includes a proximity component and a characteristic-indicative component, switch means for operating said identification means; a first trigger circuit having an input, and an output for actuating said switch means; gate means connecting said aggregate signal to said trigger circuit input, a bistable device having a set condition for providing a control signal to said gate and a reset condition wherein said control signal is absent, a second trigger circuit receiving said aggregate signal and actuated by a first selected value thereof for placing said bistable device in said set condition, and a third trigger circuit actuated by a second selected value of said aggregate signal for placing said bistable device in said reset condition.

5. In an apparatus for automatically inspecting a series of conveyor-borne objects for a physical characteristic, said apparatus, having means for selectively identifying those objects having a deficiency in said characteristic, the combination of gauging means mounted adjacent to the conveyor and responsive both to the proximity of a passing object and to the value of said characteristic therein for providing an aggregate signal which includes a proximity component and a characteristic indicative component; a flip-flop circuit including a pair of thyratron tubes, a unidirectional power source for energizing the plate-to-cathode circuits of said thyratrons, a resistor connecting the plate of each thyratron to said power source and a capacitor mutually coupling the plates of both said thyratrons; a trigger circuit connecting said signal to the control circuit of the first of said thyratrons so as to place said flip-flop in a first condition when said signal increases to a first selected value, means connecting said signal to the control circuit of said second thyratron, adjustable means for biasing said last-named control circuit to prevent said signal from placing said flip-flop in a second condition until after said signal increases to a second selected value greater than said first selected value, a third thyratron tube, a source of alternating voltage energizing the cathode-to-plate circuit of said third thyratron, a pair of summing resistors connected to the control circuit of said third thyratron, the first of said summing resistors receiving said aggregate signal, means for generating an inhibitor signal which is delivered to the second of said summing resistors when said flip-flop is in said second condition, and a relay connected in said plate-to-cathode circuit of said thyratron for controlling said identifying means.

6. In an apparatus for automatically inspecting a series of conveyor-borne containers to determine the fill level of a material placed therein, said apparatus having means adjacent to the conveyor for selectively rejecting those containers having an improper fill level, the combination of a capacitance probe mounted in proximity to the path of said containers, means for energizing said probe with a radio-frequency voltage, means energized by said radio-frequency voltage for generating a first voltage vector having a reference phase relation thereto, a center-tapped coil connected across said probe electrodes and inductively coupled to said alternating voltage so as to generate second and third substantially equal and oppositely directed voltage vectors having a variable phase relation to said radio-frequency voltage which is dependent on the impedance of said probe, means for rectifying the sum of said first and second voltage vectors to provide a first unidirectional voltage, means for rectifying the sum of said first and third voltage vectors to provide a second unidirectional voltage, switch means controlled by the difference between said unidirectional voltages for providing a signal to said rejecting means, means for enabling said switch means when said difference voltage increases to a first selected value, means for disabling said switch means when said difference voltage increases to a second selected value which is greater than said first value, and means for actuating said enabled switch means when said difference voltage decreases to a third selected value.

References Cited in the file of this patent
UNITED STATES PATENTS

| | | |
|---|---|---|
| 2,357,801 | Arelt | Sept. 12, 1944 |
| 2,734,628 | Schlayer | Feb. 14, 1956 |